United States Patent
Chiu et al.

(10) Patent No.: US 6,701,363 B1
(45) Date of Patent: Mar. 2, 2004

(54) METHOD, COMPUTER PROGRAM PRODUCT, AND SYSTEM FOR DERIVING WEB TRANSACTION PERFORMANCE METRICS

(75) Inventors: Willy W. Chiu, Los Altos Hills, CA (US); Nagui Halim, Yorktown Heights, NY (US); Joseph L. Hellerstein, Ossining, NY (US); LeRoy Albert Krueger, Jr., Woodstock, GA (US); W. Nathaniel Mills, III, Coventry, CT (US); Mark S. Squillante, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,172

(22) Filed: Feb. 29, 2000

(51) Int. Cl.⁷ .............................................. G06F 15/173
(52) U.S. Cl. ...................... 709/224; 709/202; 709/203; 709/205; 709/217; 709/218; 709/219; 345/788; 380/270; 380/34; 380/255; 702/186; 702/119; 702/176; 705/10; 705/11; 717/125; 717/183; 717/187
(58) Field of Search ........................................ 709/224

(56) References Cited

U.S. PATENT DOCUMENTS

| | | | |
|---|---|---|---|
| 4,882,751 A | * 11/1989 | Kotzin et al. | |
| 5,696,701 A | 12/1997 | Burgess et al. | 364/551.01 |
| 5,796,633 A | 8/1998 | Burgess et al. | 364/551.01 |
| 5,872,913 A | 2/1999 | Berry et al. | 395/184.01 |
| 5,949,976 A | 9/1999 | Chappelle | 395/200.54 |
| 6,006,260 A | 12/1999 | Barrick, Jr. et al. | 709/224 |
| 6,021,439 A | * 2/2000 | Turek et al. | |
| 6,282,701 B1 | * 8/2001 | Wygodny et al. | |
| 6,297,823 B1 | * 10/2001 | Bharali et al. | |
| 6,304,904 B1 | * 10/2001 | Sathyanarayan et al. | |
| 6,321,264 B1 | * 11/2001 | Fletcher et al. | |
| 6,343,320 B1 | * 1/2002 | Fairchild et al. | |
| 6,438,592 B1 | * 8/2002 | Killian | |
| 6,526,371 B1 | * 2/2003 | Klein et al. | |
| 6,556,974 B1 | * 4/2003 | D'Alessandro | |

OTHER PUBLICATIONS

Service Metrics–Why Measure–FAQs, "Frequently Asked Questions," http://www.servicemetrics.com/why_measure/freq_ques.asp, Jan. 26, 2000, pp. 1–3.

Service Metrics–Why Measure–Methodology, "Methodology," http://www.servicemetrics.com/why_measure/method.asp, Jan. 26, 2000, pp. 1–2.

(List continued on next page.)

*Primary Examiner*—Hosain Alam
*Assistant Examiner*—Young N Won
(74) *Attorney, Agent, or Firm*—Gregory M. Plow

(57) ABSTRACT

The present invention comprises a method of relating characteristics gleaned by monitoring application transaction flows (and the decomposition thereof) to produce performance metrics useful to characterize the efficiency and performance of web transactions used in a web-based application. These metrics can assist application designers and developers in reorganizing their application content, programs, and transports to provide improved service to their consumer. Events are generated and composed into predefined activities on a web transaction basis. The performance metric is then derived that entails a relationship between at least two different activities that gives insight into the performance characteristics of the web transaction. By using the derived performance metrics, designers and developers of web pages can judge the effects of changes to their application relative to efficiency and performance. Different applications can also be compared and contrasted using these metrics. Furthermore, these metrics may serve as inputs to planning models used to project capacity, throughput, response time, and availability of the application.

11 Claims, 5 Drawing Sheets

OTHER PUBLICATIONS

Service Metrics–Why Measure–SM Approach, "The SM Approach," http://www.servicemetrics.com/why_measure/approach.asp, Jan. 26, 2000, p. 1.

Service Metrics–Solutions–Glossary, "Glossary," http://www.servicemetrics.com/solutions/gloss.asp, Jan. 26, 2000, p. 1–7.

Service Metrics–Solutions–SM Webpoint, "SM–Webpoint," http://www.servicemetrics.com/solutions/webpoint.asp, Jan. 26, 2000, pp. 1–2.

Netscape–Netcenter, Web Site Garage–Improve Your Web Site, "Improve Your Site For A Great Visitor Experience," wysiwyg://230/http://websitegarage.netscape.com/ Jan. 26, 2000, p. 1.

Netscape–Netcenter, Web Site Garage:Summary Report, "Tune Up,"wysiwyg://240/http://websitegarage.netscape.com/ Jan. 26, 2000, pp. 1–2.

NetMechanic:Results–Power Tools for your Web Site! "Page Summary"wysiwyg://148/http://www.netmechanic.com/toolbox/sample_summary.htm Feb. 29, 2000, p. 1.

NetMechanic:Results–Power Tools for your Web Site! "Page Details: Load Time," wysiwyg://150/http://www.netmechanic.com/toolbox/load_details.htm Jan. 29, 2000, pp. 1–3.

Service Metrics–The Best Measure of Performance, "Objective Performance Metrics," pp. 1–15.

* cited by examiner

METHOD, COMPUTER PROGRAM PRODUCT, AND SYSTEM FOR DERIVING WEB TRANSACTION PERFORMANCE METRICS

CROSS-REFERENCE TO RELATED APPLICATIONS

This application is related to the following co-pending and commonly assigned application, which application is incorporated by reference herein:

Application Ser. No. 08/904,882 entitled "Application End-to-End Response Time Measurement and Decomposition," filed on Aug. 1, 1997, by Mark Maccabee, W. Nathaniel Mills III, and John Turek.

BACKGROUND OF THE INVENTION

1. Field of the Invention

The present invention relates to measuring and analyzing performance characteristics for accessing hyper-link documents, such as web pages, over a communications network. More specifically, the invention relates to those characteristics that are viewed at a client system that give insight to application efficiency and to web page document design and organization.

2. Present State of the Art

Web transactions comprise one or more requests for receipt of, or update to content and the associated responses to these requests. Ideally, there would be no overhead associated with performing these transactions. However, in practice, many types of overhead are needed to form and issue the request, and to form and issue the corresponding response. Examples include application protocol overheads needed to encapsulate application data (e.g., HTTP and/or FTP protocols), security overheads to encrypt and/or protect application data (e.g., Secure Sockets Layer and/or Socks protocols), network services overheads to assist with addressing application data (e.g., Domain Name Services), network routing overheads to move application requests to, and responses from the service provider (e.g., TCP/IP and/or UDP/IP protocols). Additionally, the organization of the application data may result in overheads, causing excessive request/response transactions to be issued to accomplish an application transaction (e.g., loading a page in a browser).

With the explosion of traffic on the Internet due to the World Wide Web (WWW) and ever increasing numbers of users, performance issues relating to the access of a particular document or web page have taken on increased importance. One example of such a performance issues is the round trip time of delivery of a particular web page from the moment of user request to final rendering by an application, such as a browser.

As mentioned previously, excessive response time can be due to many different factors, such as network traffic or delay, delays at the server, loads at the client system due to multiple requests, etc. Many of these problems are beyond the control of the person accessing the web page or the person designing and organizing the web page. There are a number of existing tools that may assist in measuring and resolving network problems.

Other problems are a direct result of the web page design and organization. Since a single requested web page can contain references to one or more components such as HTML documents, images, applets, and other information (any of which may result in generation of multiple requests to retrieve these components), many operations can occur between the requesting application on the client system that receives and renders the web page, and the server that responds to the request and "serves up" the requested page components. For example, a web page's HTML document may reference many images that need to be retrieved in order to fully populate and render the complete web page.

Web page performance problems due to poor web page design or organization exhibit themselves best by monitoring at the client because all of the activities that can affect performance are taken into account, including initiating and generating the web page request, sending the request(s) for the web page components, serving these requests, delivering the responses, and finally assembling and rendering the web page. Furthermore, using a client system perspective is important for improving both client application design and web page design and organization. Therefore a web page designer can take performance measurements at the client system of different variations of page design in order to select the design with the most optimal performance relative to the client application being used. Since many elements of web page access can occur in parallel, these performance measurements also give an indication of the client system efficiency in accessing the page and the application, such as a browser, in scheduling the various tasks necessary to request, retrieve and render the web page.

Tools exist that monitor and generate the "events" associated with web page access and retrieval by a client system, such as opening a socket connection, sending an HTTP Get Request, receiving an HTTP Get Request Reply, etc., and compose these events into context rich timelines and other "activities," such as delivery time, amount of data delivered, idle time servicing the socket, amount of overhead data, etc. One way of monitoring relevant events associated with web documents is disclosed in a U.S. patent application entitled "Application End-to-End Response Time Measurement and Decomposition" referenced heretofore and incorporated by reference in its entirety.

Because of the concurrent nature of web page access (i.e., activities may be performed in parallel), it is useful to group the activities in logical associations (as another activity). In this manner, for example, all activities relating to a particular GIF image access (i.e., socket connection time, server response time, actual GIF content delivery time, amount of data delivered, overhead data used, etc.) can be grouped, viewed and analyzed together despite the fact that there can be significant overlap with other logical associations, such as other image retrievals or server name resolutions.

While relatively simple measurements are known, such as the amount of data transmitted or "rates" such as the amount of data per unit time, there exists a need for more sophisticated benchmarking measurements in order to evaluate web application performance, web page design, etc. To be maximally useful, the end-product metric must be easy to assess or understand regardless of how complex the processing taken to arrive at the metric or the intricacies and relationships represented by the metric. Such performance metrics are extremely useful in that they can allow easy validation of web page design based on historical data, and they can provide objective means to compare and contrast web application performance.

SUMMARY OF THE INVENTION

One aspect of the present invention is to provide easy to use performance metrics that relate two or more activities associated with web page component access and retrieval or that relate two or more web pages or web transactions.

Another aspect of the present invention provides a metric that represents the efficiency of application data transfer vis a vis the protocol overhead of setting up and making the transfer.

Yet another aspect of the present invention provides a metric that represents the efficiency of the application in concurrently processing the different items making up a web page or other web transaction.

Further aspects of the present invention provide metrics that represent how heavily weighted a particular web page may be with images, the cost to negotiate a secure connection, and the opportunities that may exist for improved processing of a web page or other web transaction by an application, such as a browser.

Additional objects and advantages of the present invention will be realized from the following description that follows by those skilled in the art or may be learned by practicing the invention. The objects and advantages of the present invention may be obtained by the ways shown and as particularly pointed out in the appended claims.

To achieve the foregoing objects, and in accordance with the invention as embodied and broadly described herein, a method, computer program product, and system for deriving web transaction performance metrics is provided.

The present invention comprises the method of relating characteristics gleaned by monitoring application transaction flows (and the decomposition thereof) to produce metrics useful to characterize the efficiency and performance of the application. These metrics can assist application designers and developers in reorganizing their application content, programs, and transports to provide improved service to their consumer.

The present invention takes advantage of existing technologies capable of monitoring web applications that can distinguish between the application payload (e.g., the desired) and the associated overheads required to request and retrieve this payload. This is done by monitoring actions happening on the system and generating events to represent these system states (e.g., the start and end of a web page transaction) and composing activities that have relevant meaning based on relating these events (e.g., duration of the transaction, amount of data transmitted).

The invention then provides a series of relationships of these various overheads to the payload, resulting in objective, quantifiable metrics able to be used for comparison and measurement purposes. This is done by selecting important activities to compose and then devising relationships between these activities so that a numeric metric may be derived.

For example, the amount of overhead data, such as protocol data for the SOCKS or SSL protocols, or header data for an HTTP Get Request and/or HTTP Reply, or transmission and routing headers for TCP/IP packets, could be monitored as one or more activities representing overhead. The application data, such as the URL, a cookie or other text sent to the server, and the returned web page content (e.g., HTML or GIF data) itself could be accumulated in activities representing "payload." With the information in these activities, one performance metric could be derived to determine the ratio of payload to overhead thereby helping designers. Many different kinds of performance metrics are possible using this approach.

By producing these metrics, designers and developers of web pages can judge the effects of changes to their application relative to efficiency and performance. Different applications issuing requests and rendering the responses (e.g., browsers, handheld personal communications devices, internet-enable celluar phone equipment, etc.), as well as servicing these requests (e.g., web servers) can also be compared and contrasted using these metrics. Furthermore, these metrics may serve as inputs to planning models used to project capacity, throughput, response time, and availability of the various web applications.

BRIEF DESCRIPTION OF THE DRAWINGS

A more particular description of the invention briefly described above will be rendered by reference to specific embodiments thereof which are illustrated in the appended drawings. These drawings depict only one or more typical embodiments of the invention and are not therefore to be considered to be limiting of its scope. With respect to the following drawings, like reference numbers denote the same element throughout the set of drawings.

DETAILED DESCRIPTION OF THE INVENTION

Figure 1:
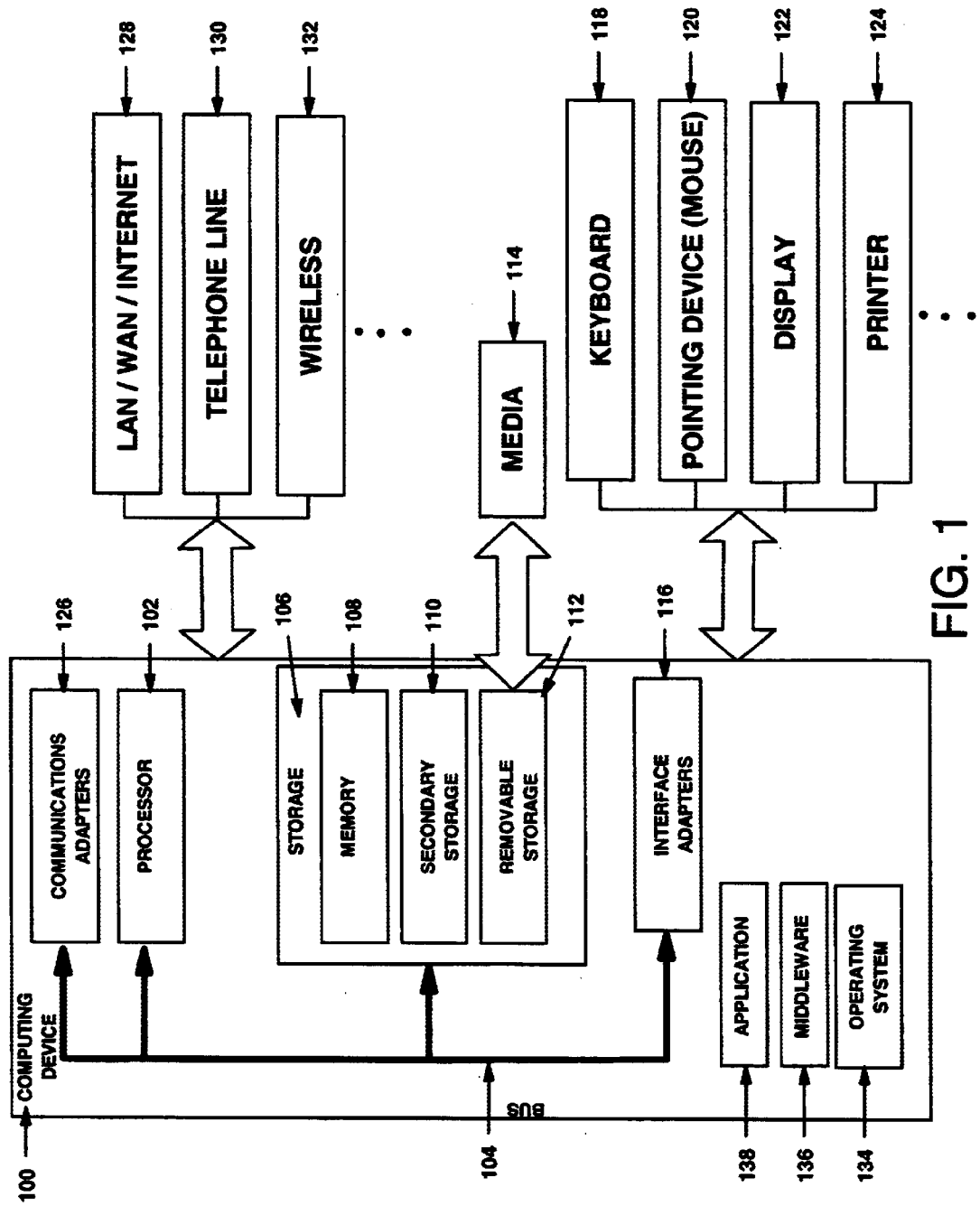
FIG. 1 is a block diagram of a computing device or system, such as a workstation, wherein the present invention may be practiced.

As used herein, the term "web page" refers to documents and other data retrieved over a communications network from a server or other computer system to a client system. A web page is typically accessed as part of a user interaction with an interface to the client computer system. For example, a user types into a browser the URL for a particular web page to initiate access, retrieval and rendering of that page on the browser. Other applications could also access web pages, such as crawlers, that would also benefit from the present invention. Those skilled in the art will recognize that XML documents, JAVA applets, and other information accessible over the Internet may benefit in like manner from the present invention.

The term "web transaction" is a broader term that envelopes the access and retrieval of a web page but also includes partial retrieval of the web page, or retrieval of a series of web pages, and/or other involvement with accessing data over the world wide web. E-business transactions comprising the searching and selection of items to be purchased, order entry, and payment submission is an example of a web transaction using multiple web pages. An applet running on a web page that periodically retrieves a stock price is an example of a partial retrieval of a web page. Other types of web-based activities the may benefit from the performance metrics of the present invention include: FTP file downloads, e-mail transmission or retrieval, stock trading applications, news group message posting or retrieval, streaming media solicitation and delivery, interactive chat room participation, open source development file check-in/check-out, etc.

As used herein, the term "events" refers to operations (changes in state) and their corresponding context (e.g., time of day, location, application, process, thread, application data (e.g., socket identifier), etc.) that occur within a computer system at specific points in time during the access, retrieval, and processing of a web transaction. Some events may be "sensed" events that are directly monitored at the system and other events may be "processed" events that are higher level events unable to be directly monitored, but gleaned through combinations of states achieved by applying simple logic. A sensed event may be the detection of a byte being delivered while a processed event would be the entire amount of data delivered, including start time and ending time.

Examples of events include, but are not limited to, requesting a communications connection, acknowledging this connection has been established, beginning or ending data transmission, sending or receiving an HTTP packet, etc. Establishing a socket, requesting or receiving resolution of a host name into an IP address, requesting routing through a firewall using the SOCKS protocol, or learning said routing has been established, and the steps involved with negotiating the encryption policies to perform secure communications, ect., are other examples of potential events.

As used herein, the term "activities" refers to predefined groupings of two or more events and interpretations of relations between these events. Examples include, but are not limited to, socket connection creation time, duration of the entire transaction to acquire and render the entire web page, time of acquiring one item of a web page (e.g., a GIF image), amount of application data received during acquisition of a web page item, amount of application data transmitted and received while performing a web transaction, amount of overhead data (i.e., protocol header data) sent and received while acquiring a web page item, etc. Generally, activities involve multiple events and associations of their context information. Note that a given event may be used in the composition of more than one activity and that those skilled in the art will recognize a myriad of activities that may be worth composing from the basic events that can be generated by monitoring systems.

Furthermore, activities can be conveniently grouped into "components" of a web page access or other web transaction. For example, all of the activities for retrieving a GIF image embedded in a textual web page could be grouped together and would contain such things as total time to retrieve the image, the amount of image data retrieved, the amount of overhead data associated with retrieving the image, the time spent creating a socket, making the connection, waiting for server response, actual delivery time, etc. Note that the activities, and the underlying events, may be happening in parallel with other components associated with processing the web page, such as another image access.

As used herein, the term "single number performance metric" or "metric" refers to a single numeric value that has meaning based on how it relates activities.

As used herein, the term "application data" refers to data requested and/or sent from an "application" that desires a web page or while performing a web transaction. Throughout, a common web browser will be used to typify a client web application. Other applications include, but are not limited to client-side application software such as compiled or interpreted software used to perform stock transactions, distributed network services such as domain name resolution or firewalls, or distributed application servers such as web servers or proxies.

FIG. 1 is a block diagram of a computing device or system, such as a workstation, wherein the present invention may be practiced. The environment of FIG. 1 comprises a single representative computing device 100, such as a personal computer, laptop, workstation, hand-held computer, information appliance, etc., including related peripheral devices. The workstation 100 includes a microprocessor 102 or equivalent processing capability and a bus 104 to connect and enable communication between the microprocessor 102 and the components of the computing device 100 in accordance with known techniques. Note that in some computing devices there may be multiple processors incorporated therein.

The microprocessor 102 communicates with storage 106 via the bus 104. Memory 108, such as Random Access Memory (RAM), Read Only Memory (ROM), flash memory, etc. is directly accessible while secondary storage device 110, such as a hard disk, and removable storage device 112, such as a floppy diskette drive, CD ROM drive, tape storage, etc. is accessible with additional interface hardware and software as is known and customary in the art. The removable storage device 112 will have associated therewith an appropriate type of removable media 114, such as a diskette, CD, tape reel or cartridge, solid state storage, etc. that will hold computer useable data and is a form of computer useable medium. Note that a computing device 10 may have multiple memories (e.g., RAM and ROM), secondary storage devices, and removable storage devices (e.g., floppy drive and CD ROM drive).

The computing device 100 typically includes a user interface adapter 116 that connects the microprocessor 102 via the bus 104 to one or more interface devices, such as a keyboard 118, a mouse or other pointing device 120, a display 122 (such as a CRT monitor, LCD screen, etc.), a printer 124, or any other user interface device, such as a touch sensitive screen, digitized entry pad, etc. Note that the computing device 100 may use multiple user interface adapters in order to make the necessary connections with the user interface devices.

The computing device 100 may also communicate with other computing devices, computers, workstations, etc. or networks thereof through a communications adapter 126, such as a telephone, cable, or wireless modem, ISDN adapter, DSL adapter, Local Area Network (LAN) adapter, or other communications channel. This gives the computing device direct access to networks 128 (LANS, Wide Area Networks (WANs), the Internet, etc.), telephone lines 130 that may be used to access other networks or computers, wireless networks 132, such cellular telephone networks, and other communication mechanisms. Note that the computing device 100 may use multiple communication adapters for making the necessary communication connections (e.g., a telephone modem card and a Cellular Digital Packet Data (CDPD). The computing device 100 may be associated with other computing devices in a LAN or WAN, or the computing device can be a client or server in a client/server arrangement with another computer, etc.

The computing device 100 provides the environment where Operating System 134, Middleware 136, and Application 138 software execute tasks and may communicate with software on the same or on other computing devices. All these configurations, as well as the appropriate communications hardware and software, are known in the art.

As will be understood by one of ordinary skill in the art, computer programs such as that described herein (e.g., Operating System 134, Middleware 136, and/or Application 138 software) are typically distributed as part of a computer program product that has a computer useable media or medium containing the program code. Therefore, "media", "medium", "computer useable medium", or "computer useable media", as used herein, be may include a diskette, a tape, a compact disc, an integrated circuit, a programmable logic array (PLA), a remote transmission over a communications circuit, a remote transmission over a wireless network such as a cellular network, or any other medium useable by computers with or without proper adapter interfaces. Note that examples of a computer useable medium include but are not limited to palpable physical media, such as a CD Rom, diskette, hard drive and the like, as well as other non-palpable physical media, such as a carrier signal, whether over wires or wireless, when the program is distributed electronically. Note also that "servlets" or "applets" according to JAVA technology available from Sun Microsystems out of Mountain View, Calif., would be considered computer program products.

Although the enabling instructions might be "written on" on a diskette or tape, "stored in" an integrated circuit or PLA, "carried over" a communications circuit or wireless network, it will be appreciated, that for purposes of the present invention described herein, the computer useable medium will be referred to as "bearing" the instructions, or the instructions (or software) will be referred to as being "on" the medium. Thus, software or instructions "embodied on" a medium is intended to encompass the above and all equivalent ways in which the instructions or software can be associated with a computer useable medium.

For simplicity, the term "computer program product" is used to refer to a computer useable medium, as defined above, which bears or has embodied thereon any form of software or instructions to enable a computer system (or multiple cooperating to systems) to operate according to the above-identified invention.

The term "data structure" refers to a particular organization of meaningful data values that can be used in a predetermined fashion. For example, a network packet has a variety of different data elements that are used and accessed by communications networks and computer nodes for transporting the packet between different computer systems. The packet, as described above, is a data structure and has a tangible embodiment in a computer useable medium when stored in a file, when loaded into system memory, when transported across a communications network, etc. in the same fashion as a computer program product.

It will be likewise appreciated that the computer hardware upon which the invention is effected contains one or more processors, operating together, substantially independently, or distributed over a network, and further includes memory for storing the instructions and calculations necessary to perform the invention.

Those skilled in the art will recognize that a system according to the present invention may be created in a variety of different ways known in the art. For example, a general purpose computing device as described in FIG. 1 may be configured with appropriate software so that the computing device functions as described hereafter.

Furthermore, discrete electronic components may be used to create a system that implements all or part of the functional. Finally, note that combinations of multiple computing devices running appropriate software or discrete electrical components can be used in like fashion. Essentially, the hardware is configured (whether by software, custom designed, etc.) to perform the functional elements making up the present invention.

Figure 2:
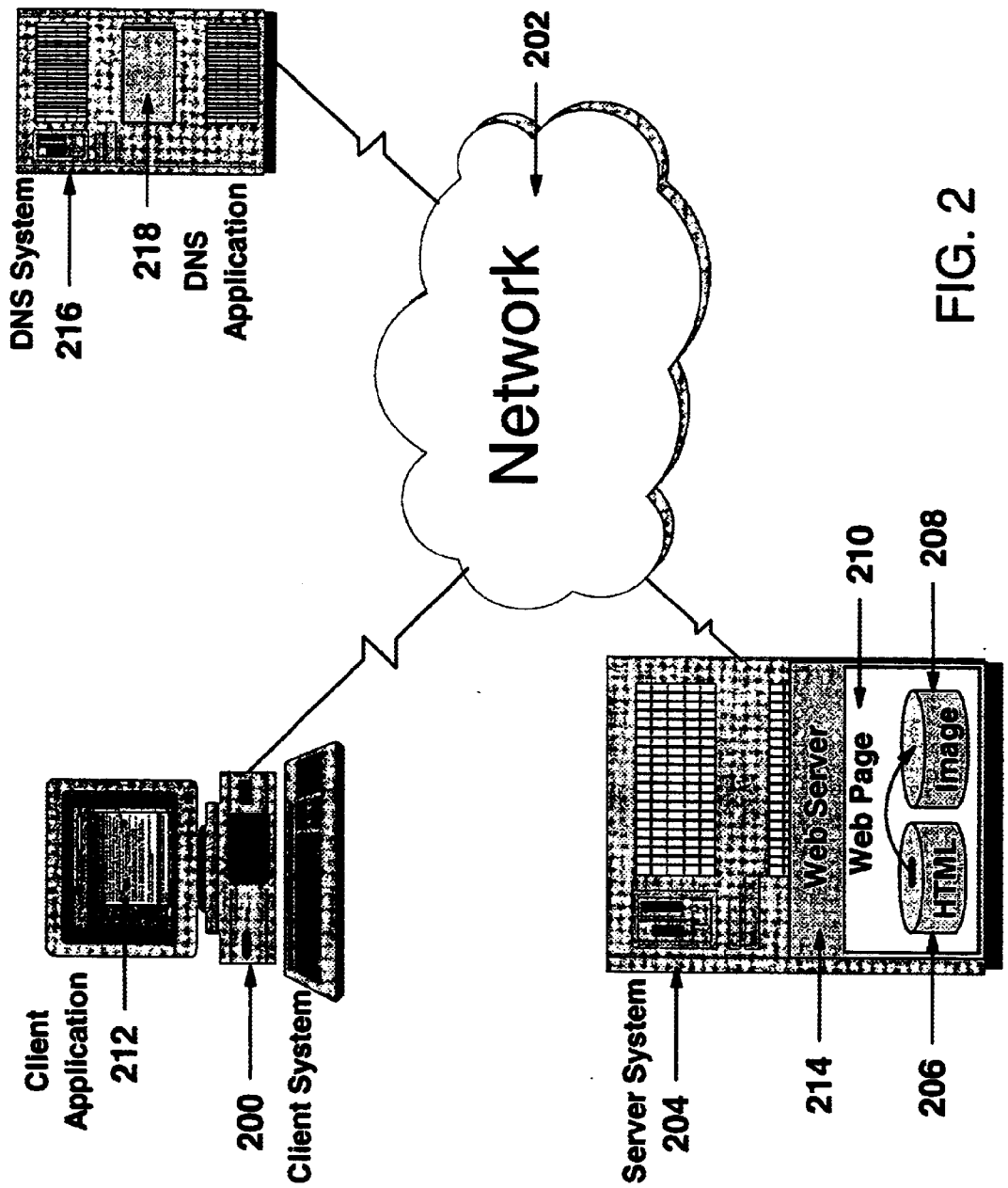
FIG. 2 is a logical diagram showing a client system, a domain name server, and a web server and their associated applications interconnected by a network providing the system to support a web transaction able to be characterized by the present invention.

Referring to FIG. 2, a logical diagram showing a client system, a domain name server, and a web server and their associated applications interconnected by a network providing the system to support a web transaction able to be characterized by the present invention is presented. Essentially, a client system 200 running various software programs has access to the network 202 through standard protocols. This allows the client system 200 to access a web page 210 residing on the server system 204 as identified by a common Uniform Resource Locator (URL).

In a simple example, the web page 210 comprises an Hyper Text Markup Language (HTML) document 206 that includes an embedded reference to an image file 208 as shown. The client application 212 resides on the client system 200 and is operated by a user (a person or other Application 138). The user interacts with the client application 212 to retrieve and render the web page 210 by entering the desired URL. The client application 212 can also be considered a set of functionality exposed to a user by partial or successive web pages 212 being retrieved and rendered from the server system 204. For example, a user purchasing products would be using an e-commerce application of the seller that would include a number of web pages requested via and presented on the browser or other application 138 on the client system 200. These web pages would likely include pages for perusing a product database, selecting a product for purchase, paying for the entire order, etc. It is well recognized in the art that there are myriads of different applications available and that will yet become available, all of which can benefit from the present invention.

Application 138, Middleware 136, and Operating System 134 software running on the client system 200 to enable such applications is common and well known in the art. This includes a protocol stack, generally following the ISO seven layer approach, where software exists to follow the different protocols in such communication including, but not limited to, the socket protocols for opening connections, security protocols, such as SOCKS and SSL for routing and encrypting data on a secure connection, transport and internet protocols, such as TCP/IP for general packetized communications, WWW protocols, such as Hyper Text Transfer Protocol (HTTP), device drivers for getting data on to the communications media, etc. Typically, each layer or protocol adds headers or other information that transforms, encapsulates or otherwise "wraps" the previous layer's data. This information is later "peeled off" in reverse order as the data travels up successive layers to arrive back in its original (or acceptably equivalent) state at the application level.

For access, retrieval, and eventual rendering of the web page 210, the client application 212 (e.g., the browser acting in response to user selection or entry of the correct URL) will first resolve the name of the server in the URL to an IP address using the Domain Name Service (DNS) provided remotely through the network 202 by the DNS server 218 running on the DNS system 216. Using this IP address, the client application 212 opens a socket and establishes a connection through the network 202 to the web server 214 running on the server system 204 using the socket protocol.

The client application then makes an HTTP Get Request for the designated URL after which the client application 220 will wait for a response from the web server 214. The web server 214 will then send an acknowledgement of the HTTP Get Request in an HTTP Reply back to the client application 212 and start the download of the web page's 210 HTML document 206.

Upon receipt of the HTTP Reply from the web server 214, the client application 212 begins receiving and processing the HTML document 206, where it will eventually recognize the embedded reference to the image 208, and send out another HTTP Get Request for the image 208. Note that this can (and should) occur before the entire processing of the HTML document 206 has completed in order to gain better performance by allowing the client application 212 to continue its HTML processing concurrent with the network 202 transmission of the image 206 request to the web server. When the HTTP Get Reply and data for both the HTML document 206 and the image 208 have completed been downloading and processing in the client application 212, it can complete the rendering of the web page 220 and the processing is for the web page 212 is completed.

For this example, there are three web page access components: DNS resolution, initial access and retrieval of the HTML document, and the access and retrieval of the image 208. For the DNS resolution component, there can be defined activities representing the time establishing the communications to the DNS system 216 and waiting on the DNS server 218 to respond with the IP address, amounts of data transmitted and received, etc. For each of the two accesses to the web server 214 located on the server system 204, there can be defined activities representing socket usage time, time to make connection, amounts of overhead data by the various protocols used to request and transfer the application data (e.g., the HTML document 206 or the image 208) data transfer time, etc.

Depending on a given web page 210 components (e.g., HTML document, applets), there may be further embedded references to images or other information (in this example there is only one) and there may be the need of reestablishing lost connections (e.g., due to protocol conventions, or server time outs), or accessing other servers and further DNS resolution of IP addresses depending on the location of the embedded information. The communications stack, the different protocols, and the general process is generally well known in the art and will not be discussed in detail.

Figure 3:
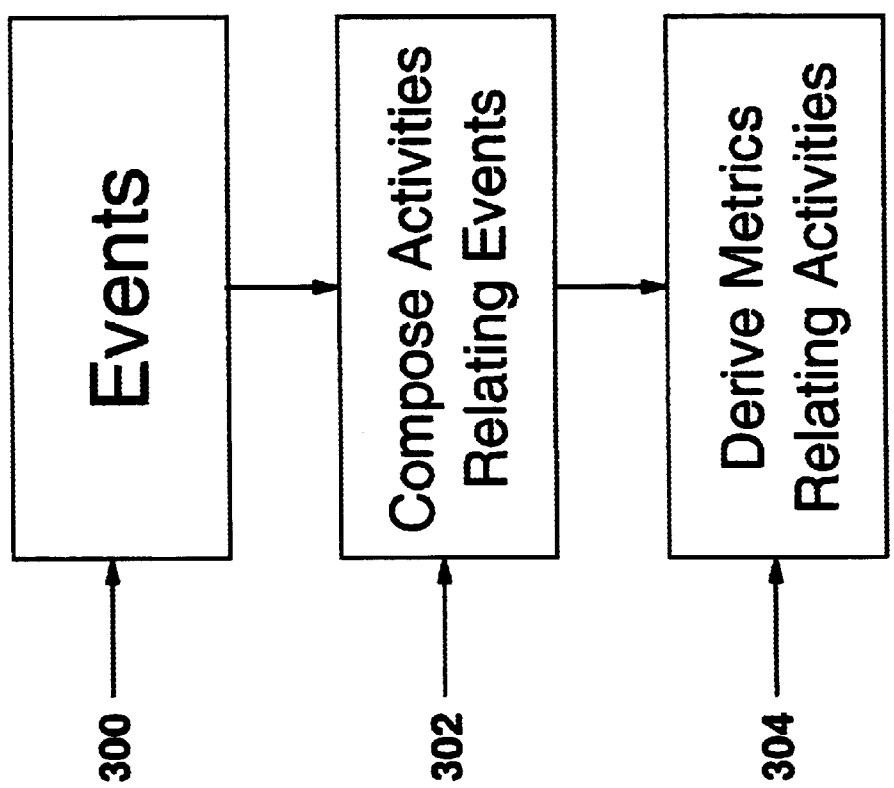
FIG. 3 is a flowchart showing the processing steps for deriving performance metrics created from predefined activities based on events that occur at the client system.

Referring now to FIG. 3, a flowchart showing the processing steps for deriving performance metrics created from predefined activities based on events that occur at the client system 200 is shown.

Beginning at step 300, events are generated at the client system by instrumentation generally known to those familiar with the art or in the manner disclosed in the aforementioned patent application. These events are reflect changes in state and include contextual information relevant to the state achieved, thereby able to describe virtually anything that happens in the client system. Events can be generated when processing enters or exits a certain code routine or when data is received from or sent over the network 202. The ability to monitor the client system and generate events is known to those skillful in the art.

At step 302, such events are composed into predefined activities relative to web page access. These activities serve useful purposes and are arbitrarily designed. For example, a client may receive several quantities of data over the network in response to a particular request (e.g., due to protocol packaging limitations, or the way in which the application asked that the response be sent), but a defined activity could aggregate and categorize all data received from the first quantity received through the last quantity received, for a given socket using a a given connection, by the type of data (e.g., application data, transport protocol data, security and encryption data, etc.), etc.

Another example would be counting elapsed time to perform a web page access. This could be done for the entire web transaction or could be broken down into time spent during different processing stages such as resolving a host name into an IP address, establishing the connection to the web server, and building and issuing a request, subdividing these stages into a series of durations by type of staged processing (e.g., socket connect time, socket idle time, socks connect time, socks idle time, ssl negotiation time, server request time, etc.), time waiting for a response from the server, and time to deliver the actual "payload", etc.

The activities could be separately tracked by web transaction, sub-component within a transaction (e.g., getting an image as part of processing a web page), etc. Note also that the same event could be used for multiple activities depending on how the activities are defined. Selection of the activity definition is done in order to get relevant measurements of what is happening on the system.

Finally, at step 304, a single numeric performance metric is derived based on the activities that relates two or more of the activities in a way to give insight into system performance. Actual examples of these derived numeric performance metrics will be shown in some detail hereafter. It is important to note that these metrics are not simply cumulative of one another (i.e., adding up the data or adding up the times) but actually define a relationship beyond what the purely measurable activities themselves give. Following are some specific examples of how the present invention derives powerful performance metrics that capture important information in an easy to use manner.

Web transaction performance is sensitive to a variety of elements, including: the composition of pieces needed to form the request or response halves of a transaction; the bandwidth(s), lengths, and number of links along which the transaction travels; the availability and capacity of the server(s) to respond to requests in a timely manner; the availability and capacity of the browser to compose requests and their responses, and render the results for use by the transaction's consumer. The following web page access transaction performance metrics are designed to highlight key measures of the transactions performance sensitivities. These metrics are described individually below.

Referring to Table 1 below, information from activities measuring certain data quantities in a web transaction to retrieve a web page 210 comprising the HTML document 206 and image 208 explained in connection with FIG. 2, is shown. These activities include measuring the bytes used to go through the SOCKS protocol, the bytes in the HTTP Get Request and Reply accumulated from each retrieval, the bytes in the web page (accumulated from the HTML document, and Image byte counts), the bytes in a "cookie" included in the HTTP Get Request for the HTML document, and the bytes in the TCP an IP protocol headers accumulated from each access.

TABLE 1

| Activity | Bytes |
| --- | --- |
| Socks Protocol (S) | 135 |
| HTTP Get Request (G) | 565 |
| TCP Protocol (TCP) | 312 |
| IP Protocol (IP) | 213 |
| HTTP Reply (R) | 600 |
| HTML Document (H) | 5215 |
| Image (I) | 11317 |

Application Data Encapsulation Efficiency (ADEE): A web transaction comprises a request and related response that communicate application specific data by using web standard protocols (e.g., HTTP, SSL, Socks, DNS). Data Encapsulation Efficiency is the ratio of application data bytes to the sum of one or more overhead bytes (from protocol or otherwise) and application data (note the choice of overhead bytes defines variants of ADEE, so for example, one could define HTTP-ADEE to only include the bytes associated with the HTTP Protocol). Overhead data is broadly defined as anything that isn't application data and is typically used to get the "payload" data back and forth to the requesting application (e.g., the browser).

Take the following example using the information from Table 1 above, the retrieval of a web page component (e.g., the HTML Document) may involve sending an HTTP Get Request (G), followed by retrieving the HTTP Response comprising an HTTP Reply header (R) and the HTML document's data (i.e., the HTML document's data) (H). In this example, the Application Data Encapsulation Efficiency would be computed as (H)/((H)+(G+R)) and given the example numbers would be 0.817 or around 82%. This metric will by definition be in the range [0,1].

One variation on Application Data Encapsulation Efficiency might include allowing a cookie (C), which may be sent in the HTTP Get Request, to be considered part of the application data, thereby making the computation: (C+H)/((C+H)+(G+R)). Yet another variation might include the overhead associated with navigating a firewall using the socks protocol (S), which would yield the computation (assuming we also wish to consider the cookie as application data): (C+H)/((C+H)+(G+R+S)).

Transport Data Encapsulation Efficiency (TDEE): This metric is similar conceptually to Application Data Encapsulation Efficiency except the divisor is increased to include more overhead data, namely, the sum of bytes used to transport the data (e.g., TCP and IP header byte counts). The differentiation between Application and Transport Encapsulation Efficiencies is that application developers may have control over the ADEE, whereas the TDEE is also controlled by the design and implementation of the communications environment used to carry the transaction. Those skilled in the art will see that there are numerous variations in combining the activities regarding the overhead data and the application data that can give insight.

When the ADEE or TDEE are low percentages, they imply a high contribution of overhead in requesting and retrieving web pages (and their component pieces). This might lead designers to investigate combining component pieces into larger payloads, thereby requiring fewer request and responses. An example might be to use a menu bar GIF rather than individual menu item GEF's arranged on the page to form a menu bar. By retrieving the entire menu bar in one operation, only one pair of HTTP headers would be used, rather than a pair for each menu item.

Low TDEE values or percentages might imply the communications layer needs to be reconfigured to package larger payloads within the TCP/IP protocol packets. There is a concept of Maximum Transmission Unit (MTU) that is often set differently depending upon the connectivity medium (e.g., dialup vs LAN). It is possible that the setting is too small (e.g., for the dialup environment) when the communications could support a larger value (e.g., for the LAN environment). Sending more payload per protocol packet reduces the number of protocol headers, but increases the liklihood that an error could be introduced requiring retransmission. This is why the less dependable communications channels tend to reduce the MTU. At any rate, the low TDEE value would indicate that greater efficiency could be had by increasing the MTU if the medium is capable.

Application Image Weight (AIW): Web transactions may communicate information using images as well as text. This metric calculates the ratio of image-based (e.g., GIFs, JPEGs) application data bytes to the sum of image-based and non-image (e.g., HTML text) application data bytes. Given the information from Table 1 above, this would be given by I/(I+H) or 0.684 or about 68% image weighting.

This ratio may be useful in measuring policies for content generation. For example, web sites may elect to have pages heavily geared toward graphical navigation at the "top" of their web site page hierarchy, with pages containing more textual details lower in the hierarchy. Another use of this metric might be to guage whether or not non-image data is being transmitted containing excessive non-executing information such as formatting whitespace, or comments on pages expected to be predominantly image based.

Encapsulated Application Image Weight (EAIW): This metric adds the additional byte counts for protocol overhead involved in requesting and retrieving the image-based application data to the image-based application data bytes and uses the result as the numerator to calculate a ratio by dividing it by the total bytes (protocol overhead and application data) for the transaction. Again, the some or all of the different overhead bytes (protocol and otherwise) might be chosen.

Referring now to Table 2 below, information from activities measuring certain data quantities in a web transaction to retrieve a web page 210 as explained in connection with FIG. 2, is shown. These activities include measuring the bytes used to go negotiate security protocols, the bytes sent when the application data is fully encrypted (i.e., includes encrypted bytes from the Get Request and Reply headers), the unencrypted bytes in the HTTP Get Request, the unencrypted bytes in the HTTP Reply, the unencrypted bytes in the web page, and the total unencrypted bytes corresponding to the filly encrypted application data (i.e., includes bytes in the Get Request and Reply headers).

TABLE 2

| Activity | Bytes |
| --- | --- |
| Security Negotiation (N) | 2713 |
| Encrypted Data (E) | 8737 |
| HTTP Get Request (G) | 485 |
| HTTP Reply (R) | 575 |
| Web Page (U) | 6347 |
| Total Unencrypted (TU) = G + R + U | 7407 |

Security Negotiation Efficiency (SNE): This performance metric is the ratio of the encrypted application data bytes (E) alone, to the sum of bytes used to negotiate security (N) and encrypted application data bytes (E). For example, using the Secure Socket Layer protocol, security is negotiated between the client and server, including initial hello's, key exchanges, and cypher selections. This will vary depending upon the reuse of sockets for subsequent requests. This ratio expresses the cost to "set up" a secure connection and is given by the equation E/(N+E). Using the example numbers from Table 2 above, the SNE would be 0.763 or around 76%.

A lower SNE value would indicate security negotiations are taking place too often while a higher SNE value would indicate efficient reuse of the security negotiation on keep-alive sockets. One could use the SNE ratio to see how well their secured web page retrievals were managing the security negotiations. There are some cases where improperly configured security options in a browser or session time out settings at the web server will cause security to be renegotiated more often than necessary.

The SNE value (as well as values to many, if not all, of the performance metrics herein) can be monitored and action taken upon it reaching a certain threshold. This threshold can be specified by a particular client, vendor, the installation, etc., in such a manner so as to customize any tool making the performance metric measurements.

Application Security Encapsulation Efficiency (ASEE): This performance metric is the ratio of the total unencrypted application data bytes (TU), to the sum of bytes used to negotiate security (N) and encrypted application data bytes (E). For example, SNE (above) does not reflect the increase (if any) in the number of bytes needed to encrypt the application data. Since the total encrypted application data bytes (E) includes the encrypted HTTP Headers and application data (e.g., web page), the ASEE metric uses the actual, unencrypted application data byte count, (e.g., reported as Content-Length in HTTP Header or otherwise the web page size (U) plus the number of bytes in the HTTP Get Request Header (G) and the number of bytes in the HTTP Response Header (R)) given as TU=U+G+R. The ASEE metric, therefore, is computed as (TU)/(N+E), and using the example numbers from table 2 above, the ASEE would be 0.647 or around 65%.

A higher ASEE value would indicate efficient use of encryption while a lower ASEE value would indicate that security negotiation is taking place too often and/or that encryption has increased the size of the payload being transferred. By comparing the SNE with the ASEE, one can understand the added expansion of the payload due to encryption (e.g., if SNE equals ASEE then TU equals E and the payload has not been expanded).

Figure 4:
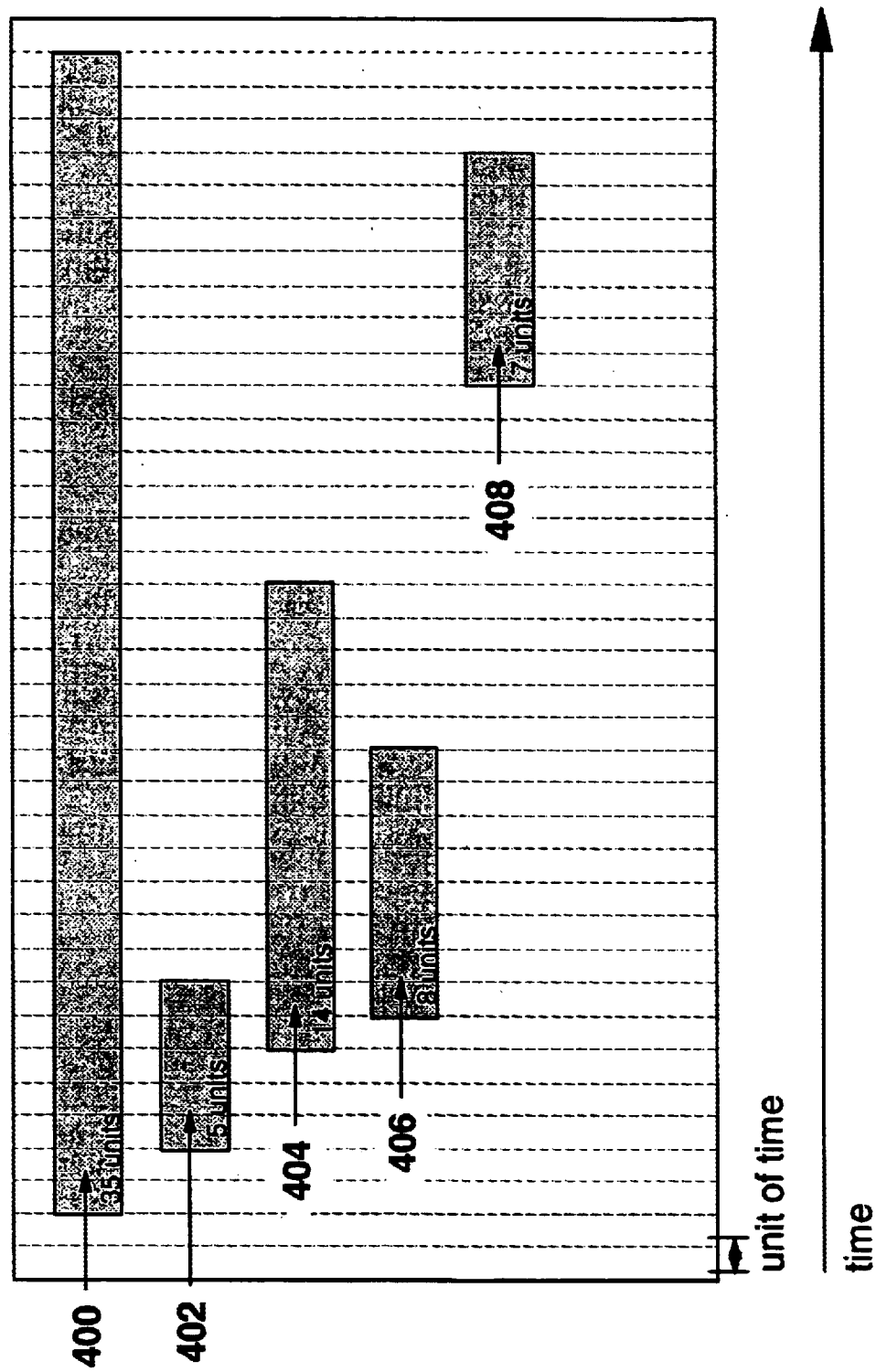
FIG. 4 is a logical diagram showing a set of logical activities that may be associated with the access and retrieval of a web page that are used to illustrate calculations of a performance metric relative to concurrent operations.

Referring now to FIG. 4, a logical diagram showing a set of logical activities that may be associated with the access and retrieval of a web page that are used to illustrate calculations of a performance metric relative to concurrent operations is shown. A web transaction 400 such as retrieving a web page covers a total of 35 time units as indicated and is broken down into separate activities, namely activity 402 having a duration of 5 time units, activity 404 having a duration of 14 time units, activity 406 having a duration of 8 time units, and activity 408 having a duration of 7 time units.

Component Activity Concurrency Efficiency (CACE): In some cases (e.g., web browsers), web transaction activities may occur concurrently using multiple execution threads, and/or multiple sockets. Such activities may also occur in an intermixed fashion rather than being done total serial fashion (i.e., waiting for one activity to complete before starting the next).

The Component Activity Concurrency Efficiency (CACE) performance metric is a measure of how efficiently the transaction has scheduled its component activites so that serial processing is kept to a minimum. An example is a browser that uses multiple threads or sockets to retrieve component URL's required to fully render a requested page from a web site. Essentially, it is desirable to maximize concurrency in order to increase performance. An example would be sending out one or more requests to the server just before beginning rendering of data just received so the browser can work while the requests are transmitted to the web server, the web server generates its responses, and the responses are returned to the browser.

The CACE performance metric is a relationship between the total serial execution time (SET) for a set of activities, the total concurrent execution time (CET) for the same activities, and the non-concurrent execution time (NCET) for the same activities. The total serial execution time is the summation of the individual activity times without regard for any overlap in time (i.e., as if the had been executed serially one right after the other). In FIG. 4, the total serial execution time for the activities 402, 404, 406, and 408 is simply the addition of the respective duration in time units and the SET value is therefore 34 time units (34=5+14+8+7).

Activity Duration Aggregation (ADA) reflects the amount of linear time when at least one activity is active and involves summing the durations of non-overlapped portions of these activities added to the sum of the duration of the intersections of these activities (e.g., the duration in linear time when at least two activities overlapped). In other words, it is the sum of the total concurrent execution time (i.e., those times when more than one activity is executing) with the total non-concurrent execution time (i.e., those times when only one of the set of activities is executing) for the set of activities, or ADA=CET+NCET.

Referring again to FIG. 4, it can be seen that activity 402 overlaps 2 time units with activity 404, and 1 time unit with activity 406; activity 404 also overlaps 8 time units of activity 406; and activity 408 doesn't overlap with any of the component activities. We would calculate the ADA as the sum of the non-overlapping portions of the activities or the total non-concurrent execution time and add in the duration of the overlapping portion or total concurrent execution time as shown below:

NCET=15 total time units=3 time units from activity 402, +5 time units from activity 404, +7 time units from activity 408

CET=9 total time units=1 time unit from activity 402 intersecting with activity 404, +1 time unit from the intersection of activities 402, 404, and 406, respectively, +7 time units from the intersection of activity 404 and activity 406.

ADA=CET+NCET=15 time unit+9 time units=24 total time units.

The CACE can then be easily calculated using the following formula: CACE=(SET/ADA)−1=(SET/(CET+NCET))−1. Again, using the numbers pertinent to the example shown in FIG. 4, the CACE value would be 0.4167.

A higher CACE value would indicate good use of concurrency, scheduling multiple requests for action simultaneously, and taking advantage of the lull induced by "outboard" processing (e.g., network delays and web server delays) to continue local processing (e.g., parsing or rendering received data) while a lower CACE value would indicate the schedule nearly approximated a serial approach to accomplishing the tasks.

Some uses for the CACE performance metric includes causing the web page designer to review the embedding of links to page components to ensure they are scheduled to maximize CACE. For example, a large GIF that is scheduled to be retrieved as the last component of the web page would likely extend the overall time needed to retrieve and render the web page. If that GIF was scheduled for retrieval earlier in the schedule, and the browser used other sockets to retrieve smaller web page components concurrent with the large GIF retrieval, the overall web page retrieval time could be shortened.

CACE is an indicator to review design and may not always be able to be minimized depending upon the use of the page. In the previous discussion, the web designer may have decided the large GIF was not critical to rendering the page useful to the customer (e.g., an advertising GIF), and by choosing to schedule it at the end allows other more meaningful content to be retrieved and rendered earlier, thereby allowing the customer to navigate elsewhere before the large GIF is completely received Multiple types of activities can be grouped together in calculations of CACE. For example, if one was interested in the activities involved in connecting to the server (e.g., activities connecting to a firewall and activities requesting that the firewall connect to the remote site), then each occurrence of either of these activities is considered as a separate activity in the set of activities for which the CACE value is calculated. So, the Connection-focused CACE would only accumulate connection oriented activities when calculating the ADA and SET, disregarding durations for payload requests and delivery.

At least two different variants of CACE values may be produced when analyzing an entire transaction. The first, dubbed CCACE reflects the processing completion at the point where rendering is completed at the client system for the received transaction so that it is completely available for use by its Consumer (i.e., the web page is completed on the display). The second, dubbed RCACE reflects the processing completion at the end of Receiving the transaction by the client regardless of the state of rendering on the display. Each of these two approaches considers idle times not explicitly measured as activities, but gleaned by comparing periods of inactivity against the overall duration from start to processing completion. For example, using FIG. 4, assuming 400 represents the overall duration from start to processing completion, ADA would be the duration of 400, while the SET would be calculated from the components 402, 404, 406, and 408, with the addition of idle times (defined to be the periods of time when 400 was active, but none of the other components was active). Idle time in FIG. 4 would equal 11, and would include 2 time units from the start of 400 to the start of 402, +6 time units between the end of 404 and the start of 408, +3 time units fro the end of 408 to the end of 400. Assuming 400 represents the duration from start to end of rendering, the calculated value for CCACE (or RCACE if 400 represented processing completion at the last byte received) for FIG. 4 would be ((34+11)/35)−1=0.2857 or 28%. This value reflects that the time to complete the web page retrieval was 28% more efficient due to concurrent activities, than it would have been had the operations occurred serially.

Figure 5:
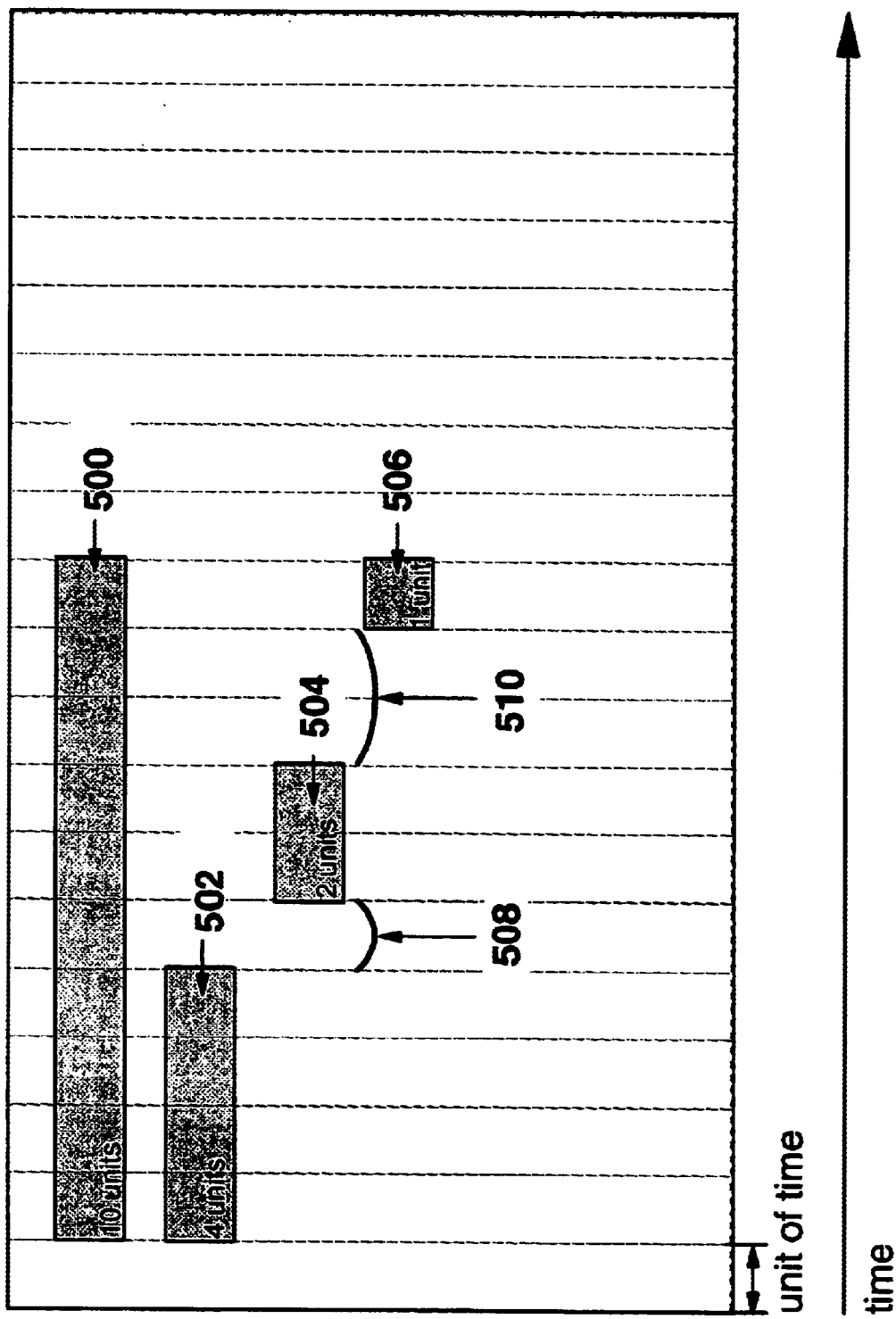
FIG. 5 is another logical diagram showing a set of logical activities that may be associated with the access and retrieval of a web page that are used to illustrate calculations of a performance metrics relative to performance optimization and potential performance improvements.

Referring now to FIG. 5, a logical diagram showing a set of logical activities that may be associated with the access and retrieval of a web page that are used to illustrate calculations of a performance metrics relative to performance optimization and potential performance improvements. FIG. 5 shows a transaction 500 lasting a total of 10 time units and having activity 502 with a duration of 4 time units, activity 504 with a duration of 2 time units, and activity 506 with a duration of 1 time unit.

Potential Performance Improvement (PPI)/Performance Optimization (PO): The Potential Performance Improvement performance metric gives a percentage measurement of opportunities for improvement. The converse (i.e., PPI+PO=1) performance metric is the Performance Optimization (PO) metric that shows a current percentage optimization. Optimization simply means that the application (e.g., web browser) is actively working during the period of the measured web transaction.

By tracking, as an activity, the difference in time between when the application has an opportunity to take action and when it actually does take action, we can identify areas or opportunities for improvement. These identified delays when the application could take action but does not can be caused by several reasons, including, but not limited to, the following: interpreting previous receipts, rendering screens, loading plug-ins (e.g., JAVA Virtual Machine), etc.

First, we accumulate the periods of inactivity (1), defined as the points when nothing is happening (but the "job" isn't finished), as well as the periods of inattention (IA), defined as the periods of time when a requested service has produced results, but the application hasn't returned to retrieve and process these results. An example of inactivity would be a request for notification that data has been received in the underlying communications layer, and the production of such notification, but a delay in actually acting upon the notification to retrieve the received data. The delay just mentioned would be a measure of inactivity. Next, we compare these accumulations against the total transaction execution time (E).

The performance optimization ratio is given by the equation: $PO=(E-(I+IA))/E$. The ratio of the sum of the inactivity (I) and inattention (IA) to the total duration is the potential performance improvement (PPI) and is given by the equation: $PPI=1-PO=1-(E-(I+IA))/E$, or simply $(I+IA)/E$.

Using the example of FIG. 5, if a transaction 500 takes 10 time units, 1 time unit of which is inactive time (I) as represented by the brackets 508, and 2 time units of which are inattention (IA) as represented by the brackets 510, the PO metric value would be 0.7 indicating 70% performance optimization ratio, and the PPI metric value would be 0.3 indicating a 30% potential performance improvement. Naturally, the higher the PO value, the fewer "dead spots" that can be removed from application processing.

Effective Delivery Rate: Currently, data delivery is measured most frequently across the communications media in rate form and typically includes all of the overhead (e.g., protocol "wrapping," etc.) data. While this simple measurement gives some insight, a more important measurement that will give insight into the application organization and web page design occurs by measuring the rate at which actual payload data is delivered to the application itself (though variations could take into account various overhead components). Actual receipt of the payload data by the application can be influenced by multiple accesses over the network for different components of a page, delay at the application in processing data as it is received, organization of a page that does not allow effective concurrent retrieval of components, bottlenecks in the operating system, etc.

The Effective Delivery Rate (EDR) performance metric can be used to evaluate an application ability to receive data relative to the potential to receive data as dictated by the speed of the communications network, operating system, etc. For example, an application operating over a T1 line (1.54 Mbits/sec) should receive data considerably faster than it would over a 28.8 Kbits/sec dialup. If the application is not paying adequate attention to receiving data (either because it is busy rendering other information, or because it uses asynchronous messaging for notification and it isn't servicing its message loop frequently enough), then the Effective Delivery Rate will be low and would indicate improvement in the page composition, reduction in the amount of data, or higher speed communications might help improve performance.

For a given application that received an amount of payload data, D, of 1533 bytes, and having a start time, T0, and an end time, T1, for delivery of the payload data so that the data was received during the period (T1-T0), P, of 8.235 seconds, the EDR would be given by the equation D/P (1533/8.235) or 186.1566 bytes per second.

It will be noted by those skilled in the art, that many of the performance metrics expressed previously in terms of data transferred may advantageously changed so that the time periods corresponding to the data transferred may be used in the same computations and give insight into performance. In like manner, there may be situations as well where using a corresponding data amount as opposed to a time period for a particular performance metric may also give insight into performance.

While the preferred embodiment of the present invention has been described in detail, it will be understood that modification and adaptations to the embodiment(s) shown may occur to one of skill in the art without departing from the scope of the present invention as set forth in the following claims. Thus, the scope of this invention is to be construed according to the appended claims and not just to the specifics disclosed in the exemplary embodiment or embodiments.

References in the claims to an element in the singular is not intended to mean "one and only" unless explicitly so stated, but rather "one or more." All structural and function equivalents to the elements of the above-described exemplary embodiment that are currently known or later come to be known to those of ordinary skill in the art are expressly incorporated herein by reference and are intended to be encompassed by the present claims. No element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or "step for."

What is claimed is:

1. A method for assessing performance of a web transaction comprising:
   generating events relative to the web transaction selected from a plurality of concurrently operational web transactions;
   organizing the generated events into a plurality of predefined activities, each activity associated with the web transaction, and wherein said plurality of predefined activities comprises measuring an amount of application data and measuring some amount of overhead data; and
   deriving a single numeric performance metric, wherein the performance metric is a ratio of the application data divided by the total of the application data and the overhead data, the metric defining a characteristic of the web transaction.

2. A method for assessing performance of a web transaction comprising:
   generating events relative to the web transaction selected from a plurality of concurrently operational web transactions;
   organizing the generated events into a plurality of predefined activities, each activity associated with the web transaction, and wherein said plurality of predefined activities comprises measuring an amount of application data devoted solely to images and measuring a total amount of application data including image and non-image data; and
   deriving a single numeric performance metric, wherein the performance metric is a ratio of the application data devoted solely to images divided by the total application data, the metric defining a characteristic of the web transaction.

3. A method for assessing performance of a web transaction comprising:
   generating events relative to the web transaction selected from a plurality of concurrently operational web transactions;
   organizing the generated events into a plurality of predefined activities, each activity associated with the web transaction, and wherein said plurality of predefined activities comprises measuring an amount of data used in negotiating security protocols and measuring an amount of encrypted application data; and
   deriving a single numeric performance metric, wherein the performance metric is a ratio of the encrypted application data divided by the sum of the encrypted application data plus the data used in negotiating the security protocols, the metric defining a characteristic of the web transaction.

4. A method for assessing performance of a web transaction comprising:
   generating events relative to the web transaction selected from a plurality of concurrently operational web transactions;
   organizing the generated events into a plurality of predefined activities, each activity associated with the web transaction, and wherein said plurality of predefined activities comprises measuring an amount of data used in negotiating security protocols, measuring an amount of encrypted application data, and measuring an amount of unencrypted application data; and
   deriving a single numeric performance metric, wherein the performance metric is a ratio of the unencrypted application data divided by the sum of the encrypted application data plus the data used in negotiating the security protocols, the metric defining a characteristic of the web transaction.

5. A method for assessing performance of a web transaction comprising:
   generating events relative to the web transaction selected from a plurality of concurrently operational web transactions;
   organizing the generated events into a plurality of predefined activities, each activity associated with the web transaction, and wherein said plurality of predefined activities comprises tracking the total inactive time (I) for a set of at least two activities, tracking the total inattentive time (IA) for the set of at least two activities, and tracking the total execution time (E) for the set of at least two activities; and
   deriving a single numeric performance metric, wherein the performance metric is $(E-(I+IA))/E$, the metric defining a characteristic of the web transaction.

6. A computer program product comprising:
   a computer usable medium;
   computer readable instructions embodied on said computer useable medium for assessing performance of a web transaction, the instructions directing a computer to perform the steps of:

generating events relative to the web transaction selected from a plurality of concurrently operational web transactions;

organizing the generated events into a plurality of predefined activities, each activity associated with the web transaction, and wherein said plurality of predefined activities comprises measuring an amount of application data and measuring some amount of overhead data; and deriving a single numeric performance metric, wherein the performance metric is a ratio of the application data divided by the total of the application data and the overhead data, the metric defining a characteristic of the web transaction.

7. A computer program product comprising:

a computer usable medium;

computer readable instructions embodied on said computer useable medium for assessing performance of a web transaction, the instructions directing a computer to perform the steps of:

generating events relative to the web transaction selected from a plurality of concurrently operational web transactions;

organizing the generated events into a plurality of predefined activities, each activity associated with the web transaction, and wherein said plurality of predefined activities comprises measuring an amount of application data devoted solely to images and measuring a total amount of application data including image and non-image data; and deriving a single numeric performance metric, wherein the performance metric is a ratio of the application data devoted solely to images divided by the total application data, the metric defining a characteristic of the web transaction.

8. A computer program product comprising:

a computer usable medium;

computer readable instructions embodied on said computer useable medium for assessing performance of a web transaction, the instructions directing a computer to perform the steps of:

generating events relative to the web transaction selected from a plurality of concurrently operational web transactions;

organizing the generated events into a plurality of predefined activities, each activity associated with the web transaction, and wherein said plurality of predefined activities comprises measuring an amount of data used in negotiating security protocols and measuring an amount of encrypted application data; and deriving a single numeric performance metric, wherein the performance metric is a ratio of the encrypted application data divided by the sum of the encrypted application data plus the data used in negotiating the security protocols, the metric defining a characteristic of the web transaction.

9. A computer program product comprising:

a computer usable medium;

computer readable instructions embodied on said computer useable medium for assessing performance of a web transaction, the instructions directing a computer to perform the steps of:

generating events relative to the web transaction selected from a plurality of concurrently operational web transactions;

organizing the generated events into a plurality of predefined activities, each activity associated with the web transaction, and wherein said plurality of predefined activities comprises measuring an amount of data used in negotiating security protocols, measuring an amount of encrypted application data, and measuring an amount of unencrypted application data; and deriving a single numeric performance metric, wherein the performance metric is a ratio of the unencrypted application data divided by the sum of the encrypted application data plus the data used in negotiating the security protocols, the metric defining a characteristic of the web transaction.

10. A computer program product comprising:

a computer usable medium;

computer readable instructions embodied on said computer useable medium for assessing performance of a web transaction, the instructions directing a computer to perform the steps of:

generating events relative to the web transaction selected from a plurality of concurrently operational web transactions;

organizing the generated events into a plurality of predefined activities, each activity associated with the web transaction, and wherein said plurality of predefined activities comprises tracking the total inactive time (I) for a set of at least two activities, tracking the total inattentive time (IA) for the set of at least two activities, and tracking the total execution time (E) for the set of at least two activities; and deriving a single numeric performance metric, wherein the performance metric is $(E-(I+IA))/E$, the metric defining a characteristic of the web transaction.

11. A method for facilitating a performance evaluation of a client web application, said method comprising:

deploying one or more tools wherein said tools monitor state changes and generate events within a computer system related to a web transaction;

organizing a first plurality of said events to form a first activity;

organizing a second plurality of said events to form a second activity;

utilizing a first metric associated with said first activity and a second metric associated with said second activity to calculate a non-cumulative single numeric performance metric, wherein the performance metric equals $(E-(I+IA))/E$ and wherein said performance metric defines a characteristic of said web transaction; and making said performance metric available to said performance evaluation.

* * * * *